(12) United States Patent
Zeller

(10) Patent No.: US 8,981,697 B2
(45) Date of Patent: Mar. 17, 2015

(54) ASSET CONDITION MONITORING IN AN ELECTRIC MOTOR

(71) Applicant: Schweitzer Engineering Laboratories, Inc., Pullman, WA (US)

(72) Inventor: Mark L. Zeller, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 207 days.

(21) Appl. No.: 13/645,361

(22) Filed: Oct. 4, 2012

(65) Prior Publication Data

US 2013/0088799 A1 Apr. 11, 2013

Related U.S. Application Data

(60) Provisional application No. 61/545,031, filed on Oct. 7, 2011.

(51) Int. Cl.
| | | |
|---|---|---|
| H02P 7/00 | (2006.01) |
| H02H 7/08 | (2006.01) |
| H02H 3/08 | (2006.01) |
| H02H 3/093 | (2006.01) |
| H02H 3/10 | (2006.01) |
| H02H 3/16 | (2006.01) |
| H02H 3/20 | (2006.01) |
| H02H 3/34 | (2006.01) |
| H02H 3/38 | (2006.01) |
| H02H 5/04 | (2006.01) |

(52) U.S. Cl.
CPC ............. *H02H 7/0822* (2013.01); *H02H 3/083* (2013.01); *H02H 3/093* (2013.01); *H02H 3/10* (2013.01); *H02H 3/165* (2013.01); *H02H 3/207* (2013.01); *H02H 3/34* (2013.01); *H02H 3/385* (2013.01); *H02H 5/042* (2013.01); *H02H 7/0816* (2013.01)
USPC .............. 318/432; 318/453; 318/490; 361/24

(58) Field of Classification Search
USPC .................... 318/430, 432, 400.02, 494, 778, 318/400.34, 802, 702, 798, 807, 453, 490; 361/24, 32
See application file for complete search history.

(56) References Cited

U.S. PATENT DOCUMENTS

| | | | |
|---|---|---|---|
| 4,547,826 A | * | 10/1985 | Premerlani ..................... 361/25 |
| 4,743,818 A | | 5/1988 | Quayle |
| 4,914,386 A | | 4/1990 | Zocholl |
| 4,939,437 A | * | 7/1990 | Farag et al. ................... 318/473 |
| 5,086,264 A | | 2/1992 | Kelledes |
| 5,436,784 A | | 7/1995 | Schweitzer |

(Continued)

OTHER PUBLICATIONS

Stanley E. Zocholl, Schweitzer Engineering Laboratories, Inc.—Tutorial: From Steinmetz Model to the Protection of High Inertia Drives, Oct. 2006.

(Continued)

*Primary Examiner* — Paul Ip

(74) *Attorney, Agent, or Firm* — Richard M. Edge

(57) ABSTRACT

The motor monitoring system of the present disclosure uses several calculated monitoring values to determine a status of a motor and take a predetermined action when a threshold corresponding with the monitoring value is exceeded. The threshold may be calculated by an intelligent electronic device (IED) monitoring the motor. The predetermined action may include further monitoring of the motor. The predetermined action may include monitoring equipment not directly monitored by the IED.

26 Claims, 6 Drawing Sheets

(56) References Cited

U.S. PATENT DOCUMENTS

| | | | |
|---|---|---|---|
| 5,448,442 A * | 9/1995 | Farag | 361/24 |
| 5,539,601 A | 7/1996 | Farag | |
| 5,726,911 A * | 3/1998 | Canada et al. | 702/32 |
| 5,793,595 A | 8/1998 | Schweitzer | |
| 5,852,351 A * | 12/1998 | Canada et al. | 318/490 |
| 6,042,265 A | 3/2000 | Kliman | |
| 6,138,078 A * | 10/2000 | Canada et al. | 702/44 |
| 6,199,018 B1 * | 3/2001 | Quist et al. | 702/34 |
| 6,262,550 B1 * | 7/2001 | Kliman et al. | 318/565 |
| 6,297,742 B1 * | 10/2001 | Canada et al. | 340/635 |
| 6,356,421 B1 | 3/2002 | Guzman-Casillas | |
| 6,757,146 B2 | 6/2004 | Benmouyal | |
| 6,900,607 B2 * | 5/2005 | Kleinau et al. | 318/432 |
| 6,975,946 B2 * | 12/2005 | Al-Hamrani | 702/60 |
| 7,065,437 B2 * | 6/2006 | Mir et al. | 701/41 |
| 7,123,457 B2 | 10/2006 | Schweitzer | |
| 7,141,953 B2 * | 11/2006 | Cohen et al. | 318/806 |
| 7,161,778 B2 | 1/2007 | Zocholl | |
| 7,176,650 B2 * | 2/2007 | Mayes | 318/400.04 |
| 7,190,137 B2 * | 3/2007 | Lelkes | 318/400.23 |
| 7,199,549 B2 * | 4/2007 | Kleinau et al. | 318/798 |
| 7,202,629 B2 * | 4/2007 | Jadot et al. | 318/812 |
| 7,576,506 B2 * | 8/2009 | Kleinau et al. | 318/471 |
| 7,586,281 B2 * | 9/2009 | Cohen et al. | 318/471 |
| 7,652,444 B2 * | 1/2010 | Kessler et al. | 318/461 |
| 7,675,720 B1 * | 3/2010 | Zocholl et al. | 361/25 |
| 7,898,203 B2 * | 3/2011 | Davis et al. | 318/490 |
| 8,054,609 B2 * | 11/2011 | Santos | 361/434 |
| 8,080,964 B2 * | 12/2011 | Hudson et al. | 318/568.11 |
| 8,084,984 B2 * | 12/2011 | Lu et al. | 318/800 |
| 8,232,750 B2 * | 7/2012 | Smugeresky et al. | 318/66 |
| 8,232,760 B2 * | 7/2012 | Lu et al. | 318/807 |
| 8,255,200 B2 * | 8/2012 | Ingraham et al. | 703/14 |
| 8,339,093 B2 * | 12/2012 | Lu et al. | 318/807 |
| 8,484,150 B2 | 7/2013 | Sparling | |
| 8,618,761 B2 * | 12/2013 | Hudson et al. | 318/568.11 |
| 2003/0071594 A1 * | 4/2003 | Kleinau et al. | 318/567 |
| 2003/0076061 A1 * | 4/2003 | Kleinau et al. | 318/432 |
| 2003/0076064 A1 * | 4/2003 | Kleinau et al. | 318/567 |
| 2003/0076065 A1 * | 4/2003 | Shafer et al. | 318/567 |
| 2003/0077179 A1 * | 4/2003 | Collins et al. | 417/63 |
| 2004/0056615 A1 * | 3/2004 | Jonsson et al. | 318/434 |
| 2004/0260488 A1 * | 12/2004 | Al-Hamrani | 702/60 |
| 2005/0029983 A1 * | 2/2005 | Mijalkovic et al. | 318/818 |
| 2005/0043873 A1 * | 2/2005 | Mir et al. | 701/41 |
| 2005/0088137 A1 * | 4/2005 | Cohen et al. | 318/806 |
| 2005/0122642 A1 * | 6/2005 | Plemmons et al. | 361/23 |
| 2005/0151494 A1 * | 7/2005 | Lelkes | 318/439 |
| 2006/0091846 A1 * | 5/2006 | Mayes | 318/701 |
| 2006/0196265 A1 * | 9/2006 | Dimino et al. | 73/460 |
| 2006/0209480 A1 * | 9/2006 | Fritsch et al. | 361/79 |
| 2006/0232237 A1 * | 10/2006 | Jadot et al. | 318/799 |
| 2006/0250102 A1 * | 11/2006 | Payne | 318/569 |
| 2006/0273753 A1 * | 12/2006 | Cohen et al. | 318/806 |
| 2007/0132446 A1 * | 6/2007 | Kleinau et al. | 324/160 |
| 2007/0182352 A1 * | 8/2007 | Oxle et al. | 318/453 |
| 2007/0182359 A1 * | 8/2007 | Wahler | 318/796 |
| 2008/0017245 A1 * | 1/2008 | Kessler et al. | 137/2 |
| 2008/0018288 A1 * | 1/2008 | Malrait et al. | 318/721 |
| 2008/0266728 A1 * | 10/2008 | Santos | 361/24 |
| 2008/0315811 A1 * | 12/2008 | Hudson et al. | 318/400.34 |
| 2009/0299720 A1 * | 12/2009 | Ingraham et al. | 703/14 |
| 2010/0007299 A1 * | 1/2010 | Davis et al. | 318/490 |
| 2010/0060227 A1 * | 3/2010 | Zocholl et al. | 318/778 |
| 2010/0156338 A1 * | 6/2010 | Lu et al. | 318/798 |
| 2010/0214709 A1 * | 8/2010 | Hall et al. | 361/93.9 |
| 2010/0315033 A1 * | 12/2010 | Lu et al. | 318/702 |
| 2010/0315034 A1 * | 12/2010 | Lu et al. | 318/802 |
| 2011/0204829 A1 * | 8/2011 | Smugeresky et al. | 318/66 |
| 2011/0213744 A1 | 9/2011 | Sparling | |
| 2011/0279076 A1 * | 11/2011 | Hirt | 318/503 |
| 2012/0056570 A1 * | 3/2012 | Hudson et al. | 318/494 |
| 2012/0217908 A1 * | 8/2012 | Wu et al. | 318/400.02 |
| 2012/0280645 A1 * | 11/2012 | Olsson et al. | 318/802 |
| 2013/0107400 A1 | 5/2013 | Meng | |

OTHER PUBLICATIONS

E.O. Schweitzer, III, S.E. Zocholl, Aspects of Overcurrent Protection for Feeders and Motors, May 1994.

Stanley E. Zocholl, Comparing Motor Thermal Models, 2003.

Patrick Whatley, Mark Lanier, Lee Underwood, Stan Zocholl, Enhanced Motor Protection with the Slip-Dependent Thermal Model: A Case Study, Sep. 12, 2007.

S.E. Zocholl, Induction Motors: Part I—Analysis, 1996.

S.E. Zocholl, Induction Motors: Part II—Protection, 1996.

Stanley E. Zocholl, Optimizing Motor Thermal Models, Apr. 24, 2006.

Stanley E. Zocholl, Armando Guzman-Casillas, Thermal Models in Power System Protection, 1999.

S.E. Zocholl, Understanding Service Factor, Thermal Models, and Overloads, Oct. 2005.

S.E. Zocholl, Gabriel Benmouyal, Using Thermal Limit Curves to Define Thermal Models of Induction Motors, Oct. 2001.

Ed Lebenhaft, Field Evaluation of Slip-Dependent Thermal Model for Motors with High-Inertia Starting, May 2007.

Ed Lebenhaft, Mark Zeller, Estimating Key Parameters for Protection of Undocumented AC Motors, Mar. 18, 2008.

Ed Lebenhaft, Mark Zeller, Advanced Thermal Motor Protection Using Digital Relays, Oct. 6, 2008.

\* cited by examiner

ASSET CONDITION MONITORING IN AN ELECTRIC MOTOR

RELATED APPLICATION

This application claims the benefit under 35 U.S.C. §119(e) of U.S. Provisional Application No. 61/545,031, filed 7 Oct. 2011, naming Mark L. Zeller as inventor, which is hereby incorporated by reference herein in its entirety.

TECHNICAL FIELD

This disclosure relates to monitoring and protection of electric power equipment. More particularly, this disclosure relates to monitoring and protection of electric power motors using an intelligent electronic device (IED).

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
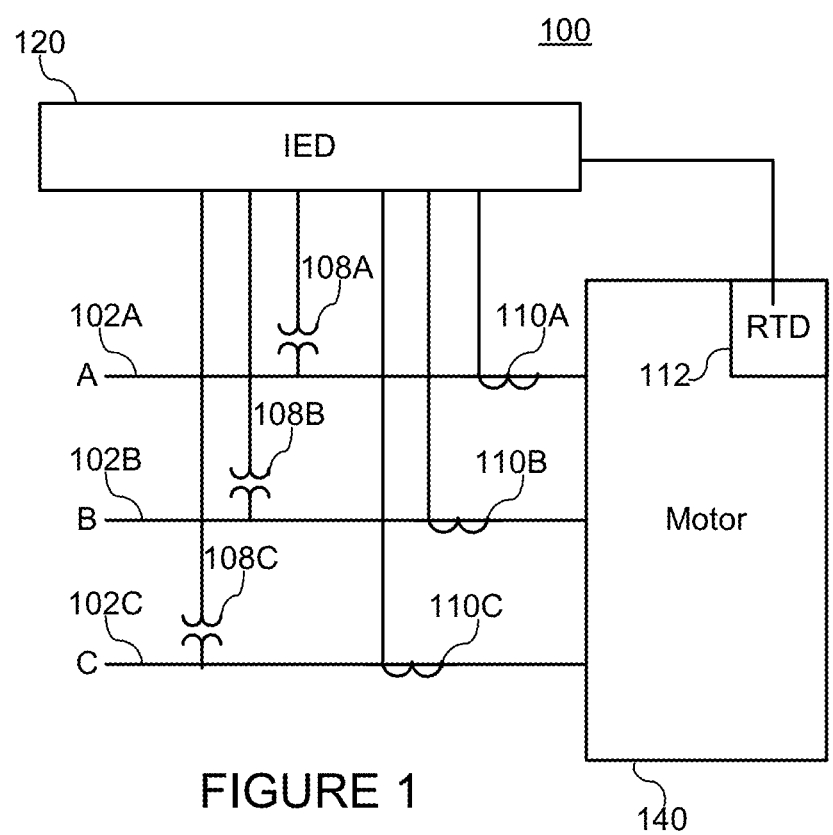
FIG. 1 is a block diagram of an IED monitoring and protecting a three-phase motor.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be illustrated as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a machine-readable medium having stored thereon instructions that may be used to program a computer (or other electronic device) to perform processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

Three-phase motors are widely used throughout industry to transform electrical energy to mechanical energy which may be used to perform work. Motors are often necessary pieces of equipment for performing numerous industrial tasks from pumping water to processing materials. Because motors are such an integral part of many industries, loss of use of a motor can cause great delays and loss of income while the motor is off line. Therefore, many motor conditions are monitored. Some of these conditions include, for example, temperatures at various points of the motor (bearing, winding, ambient, etc.), neutral current, phase current, phase voltage, thermal capacity used during start and/or while running, motor start time, starts since last reset, phase current imbalance, negative-sequence current, time to trip, phase-to-phase voltage, impedance during start, starts per hour (or day), and the like.

Monitoring and protection of motors is carefully controlled such that a motor is not taken off line unless it is indeed experiencing a condition that would warrant such action. For example, motor protection schemes meant to interrupt a motor startup due to overheating attempt to determine as accurately as possible the temperature conditions of the rotor. If the schemes are overly conservative, the motor startup would be prematurely stopped, resulting in unnecessary and disruptive downtime. However, if the schemes underestimate the actual temperature conditions, the motor may experience unnecessary and premature harm due to the elevated temperature conditions.

Intelligent electronic devices (IEDs) are often used to monitor various aspects of electric motors and provide protection thereto. Using certain values provided by the motor manufacturer as well as the currents and voltages supplied to the motor, IEDs can be programmed to determine various conditions of the motor and provide protection to the motor by taking the motor off line when certain conditions are determined to be present in the system. For example, the IED may be programmed to determine the temperature of the rotor and take the motor off line if the temperature exceeds a certain value. While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

As used herein, the term IED may refer to any microprocessor-based device that monitors, controls, automates, and/or protects monitored equipment within the system. Such devices may include, for example, digital fault recorders, phase measurement units (PMUs), phase measurement and control units (PMCUs), phasor data concentrators (PDCs), Supervisory Control and Data Acquisition (SCADA) systems, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. IEDs may be connected to a network, and communication on the network may be facilitated by networking devices including, but not limited to, multiplexers, routers, hubs, gateways, firewalls, and switches. Furthermore, networking and communication devices may be incorporated in an IED or be in communication with an IED. The term IED may be used interchangeably to describe an individual IED or a system comprising multiple IEDs.

FIG. 1 illustrates a block diagram of a system 100 including a three-phase motor 140 and a protective IED 120. The motor includes inputs from each phase of electric power 102A, 102B, and 102C. The inputs each include a current transformer 110A, 110B, 110C for providing inputs to the IED representing the currents from each phase to the motor 140. The inputs each also include a potential transformer 108A, 108B, and 108C for proving inputs to the IED representing the voltages of each phase to the motor 140. With the current and voltage signals from each phase, the IED 120 can monitor various conditions of the motor 140. Further, the motor may be equipped with various resistive temperature devices (RTDs) or other temperature transducers, such as RTD 112. The RTDs can be at various places of the motor, such as the bearings, the windings, or even in the ambient. IED 120 may be in communication with the RTDs such as RTD 112 and collect temperature information from the motor 140 using the RTDs.

With the various current, voltage, and temperature information, the IED can calculate numerous monitoring values of the IED. Using various settings and static information about the motor, IED 120 can calculate many of the monitoring values. For example, using current and voltage values, the slip and rotor temperature can be calculated (using, for example, the methods described in U.S. Pat. No. 7,675,720). Some additional monitoring values that can be calculated include: temperatures at various points of the motor (bearing, winding, ambient, etc.); neutral current; phase current; phase voltage; thermal capacity used during a start and/or while running; motor start time; starts since last reset; phase current imbalance; negative-sequence current; time to trip; phase-to-phase voltage; impedance during start; and, starts per time (e.g. hour, day).

As mentioned above, because motors may play a central role in various industrial and utility operations, tripping a motor is typically done quite conservatively so as to not interrupt processes. The present disclosure allows a user to set an IED to protect the motor using various monitoring values available and/or calculated within the IED. For example, an alarm based on the values available within the IED may alert a user that a corrective action or other preventative maintenance should be performed such that motor failure is avoided.

IED 120 may be configured to calculate various monitoring values such as those listed above. IED 120 may be further configured to allow a user to set thresholds for a number of the monitoring values, and actions to be taken when the thresholds are breached. Furthermore, IED 120 may be configured to allow a user to set multiple thresholds for a number of the monitoring values, and separate actions to be taken when each of the thresholds are breached. Finally, IED 120 may be configured to allow a user to assign predetermined actions only when a set of thresholds are breached. IED 120 may include a computer programming capability wherein a user can configure such thresholds.

Furthermore, IED 120 may be configured to calculate many of the thresholds based on operation of the motor. For example, IED 120 may be configured to record current, voltage, slip, and temperature during startup. After a predetermined number of successful startups, the IED may use the recorded time-to-start, thermal capacity used, maximum phase current, maximum neutral current, and minimum voltage, for example, to determine thresholds for the monitored time-to-start, thermal capacity used, maximum phase current, maximum neutral current, and minimum voltage. IED 120 may use an average of the recorded values for a particular monitoring value to determine the threshold value. IED 120 may multiply the average by a predetermined number to obtain the threshold for the particular monitoring value. Using the motor startup information to determine the thresholds allows monitoring for changes without extensive data entry for each motor.

Figure 2:
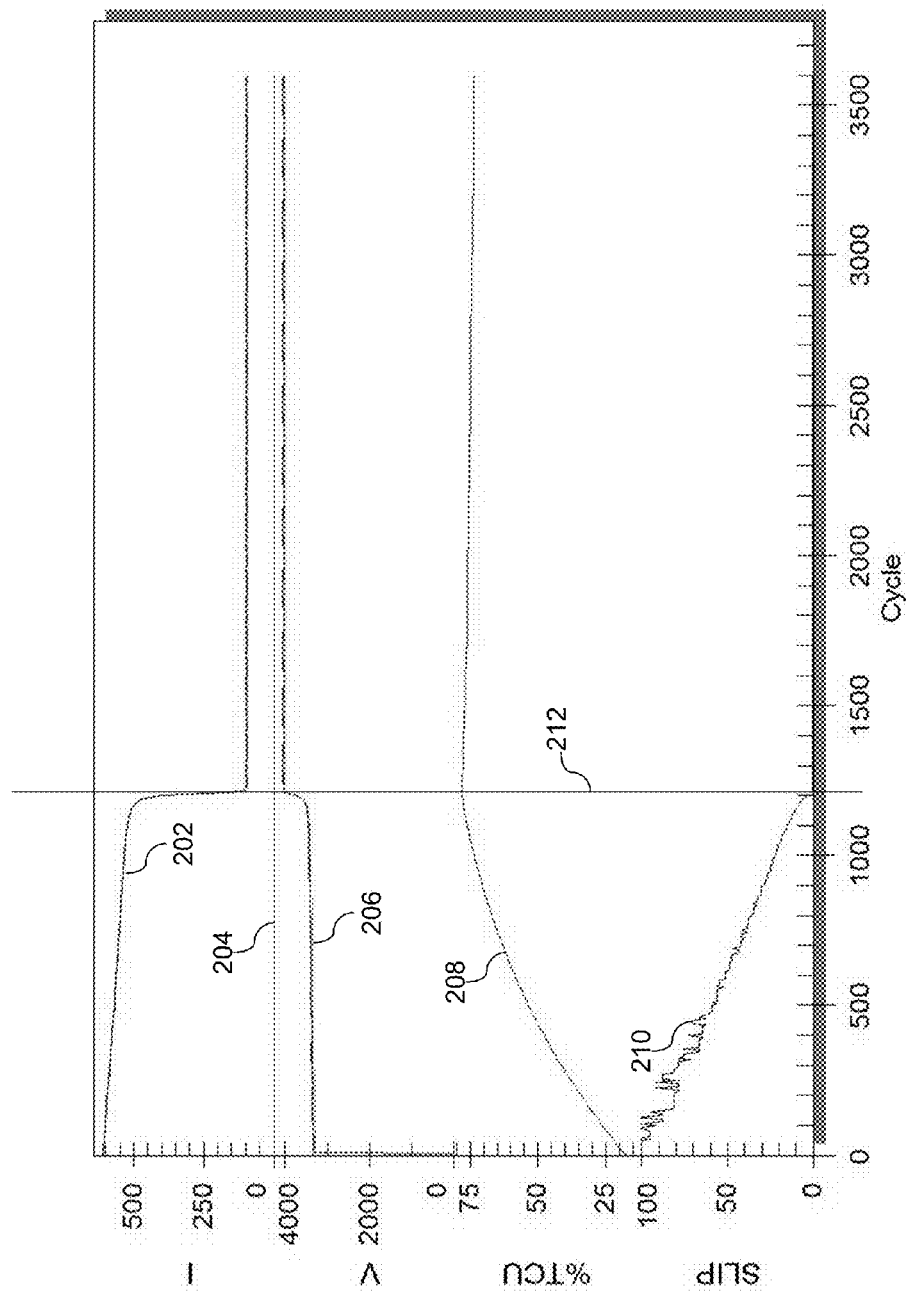
FIG. 2 illustrates a plot of a motor startup process indicating a time to start.
Figure 3:
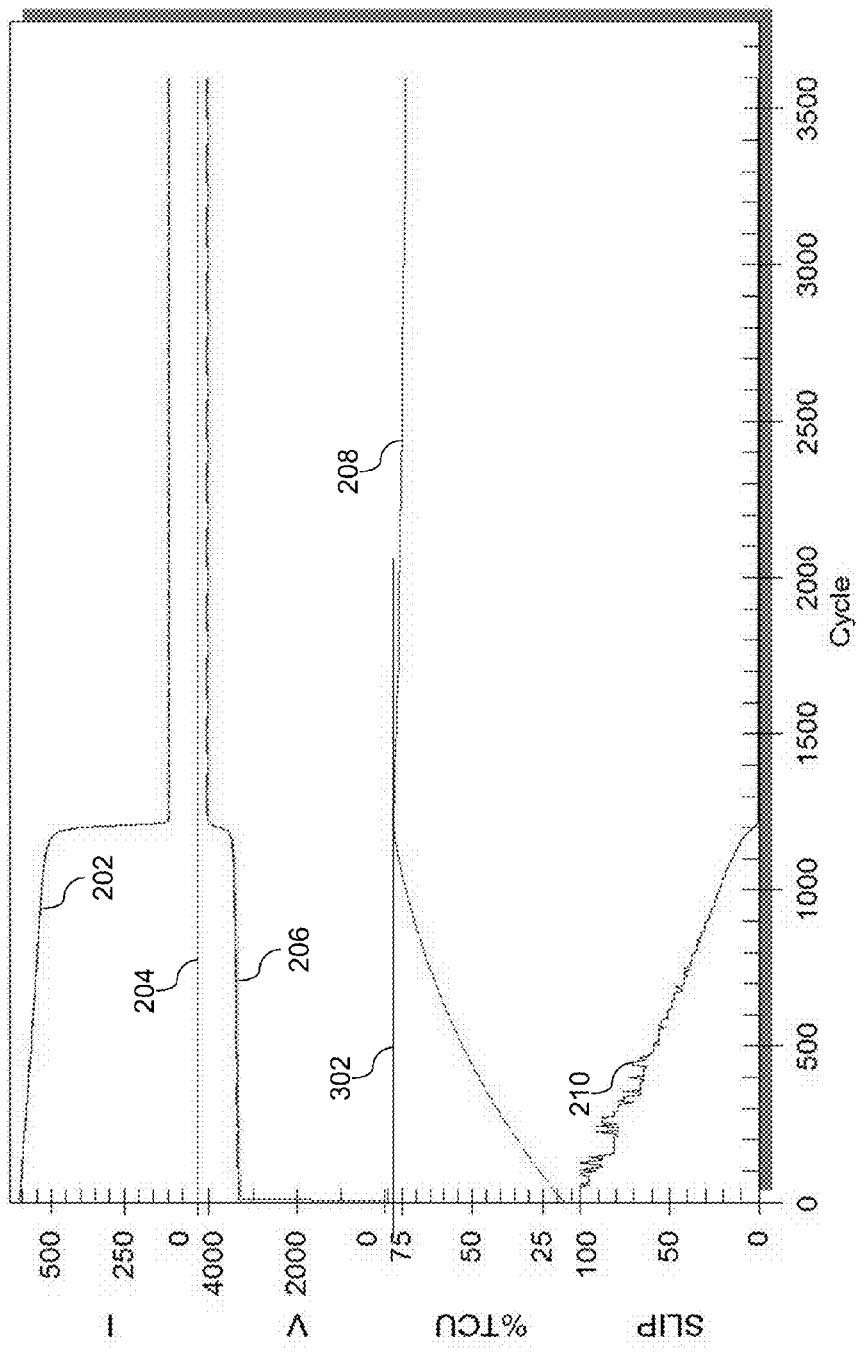
FIG. 3 illustrates a plot of a motor startup process indicating a thermal capacity used during the startup.
Figure 4:
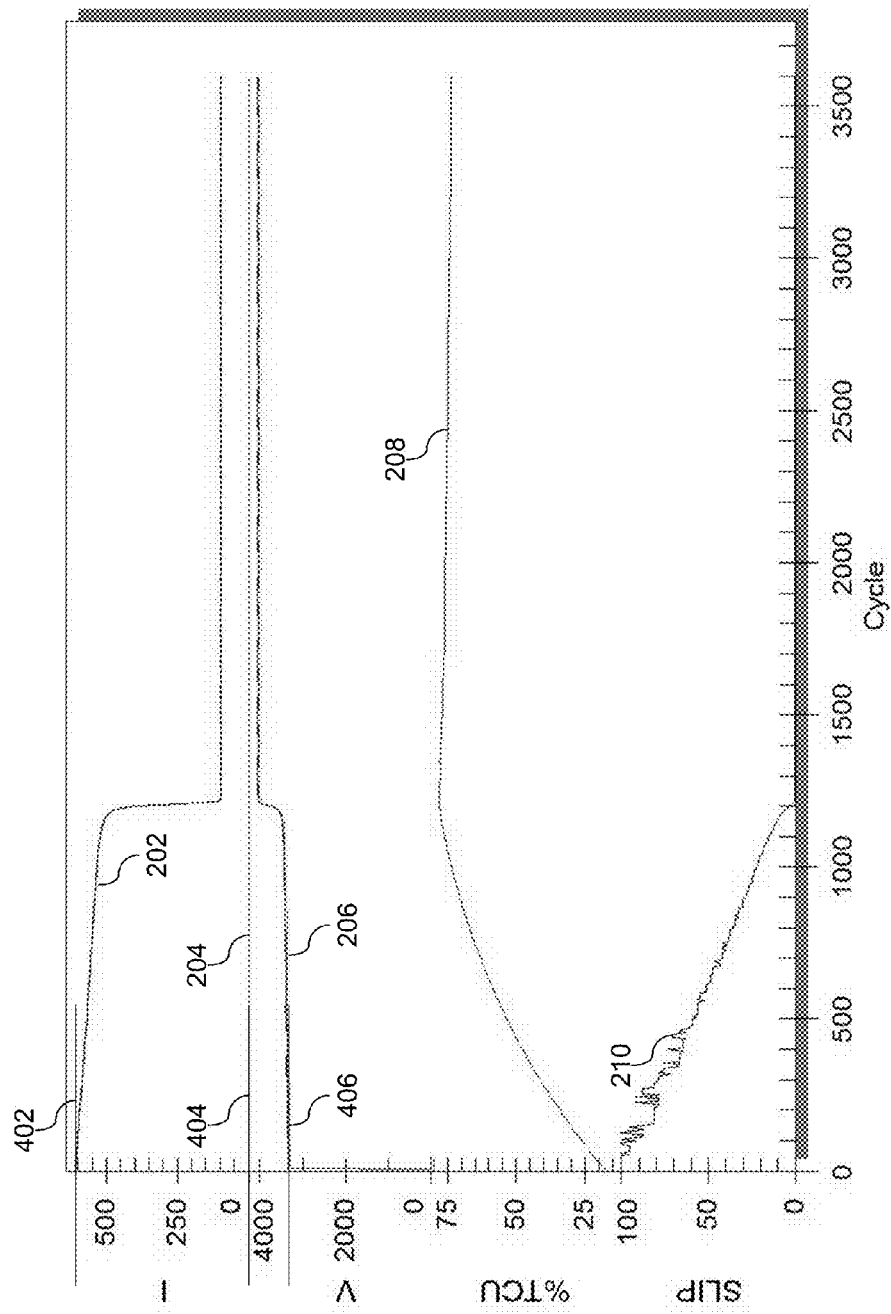
FIG. 4 illustrates a plot of a motor startup process indicating various electrical properties at startup.

FIGS. 2-4 illustrate plots of current, voltage, slip, and temperature during startup. FIG. 2 illustrates the point that the motor is started to show the time to start. The plot of FIG. 2 includes measurements for phase current 202, neutral current 204, phase voltage 206, thermal capacity used 208, and slip 210. The plot of FIG. 2 may be used to calculate, for example, a time-to-start value for a motor. In one embodiment, the time-to-start is calculated based on the current transition. As shown in FIG. 2, the current transition 212 is shown as taking place at approximately 1,200 cycles, or 19.2 seconds. Once a threshold time-to-start value has been determined the value may be monitored for deviation. Deviation in the time-to-start for a particular motor can be an indication of damaged or broken rotor bars or a change in other operation parameters. Triggering an alarm based on a deviation of the time-to-start may alert a user to perform predictive maintenance that could improve motor performance and prolong the life of the motor. Other conditions that may be indicated by a deviation in time-to-start include, for example, low motor flux, low voltage, improper process start conditions, change in load, poor electrical connections, improper motor lead connections, wrong replacement motor installation, problem with electronic drive unit and the like.

FIG. 3 illustrates the maximum of the percent of the thermal capacity used during startup. As shown in FIG. 3, the maximum thermal capacity used 302 is approximately 75%. Thermal capacity used can be an indication of the work performed by the motor. Monitoring the thermal capacity used can indicate that the motor is approaching the thermal protection limit point. The rate of change of thermal capacity used can be used to indicate unusual process or motor operation. The thermal capacity used can be used as a process control variable to maintain the work performed by a motor by varying the infeed to the motor based on the thermal capacity used level. The thermal capacity used can also be used to predict the cooling time needed before a start can be initiated and prevent a premature start that could damage the motor FIG. 4 illustrates the maximum phase current 402, maximum neutral current 404, and minimum voltage 406 during a startup. Once a threshold value for the maximum phase current 402, maximum neutral current 404, and minimum voltage 406 during startup has been determined, those values may be monitored for deviation. Deviation in these values, although the deviation may not rise to a trip level, can be a sign of other motor problems and may be used to alert a user. For example, excessive voltage sags can damage a motor and indicate issues with the broader electrical system. Based on an alarm of sagging voltage, a user may diagnose electrical problems and prevent motor damage. Voltage or current imbalances can indicate poor connections or motor winding damage or other phase specific issues. Detailed evaluation of the current signal can identify broken rotor bars, motor eccentricity, bearing issues, motor winding problems or other motor issues As described briefly above, various actions may be taken based on a deviation from or exceeding a threshold for the monitoring values. Actions to be taken may depend on the monitoring value tracked. One action that can be taken is to open a breaker or starter contactor, and trip the motor. Another is to trigger an alarm. Another may be to send a message to a database, a supervisory control and data acquisition system, or a user. Further, the action may include initiating a separate monitoring function. For example, if excessive voltage sags are detected, monitoring of the electric power supply system may be initiated to diagnose broader electrical system problems and prevent motor damage. Excessive start times may be indicative of a broken bar, and may, therefore, cause a broken bar detection algorithm to run on the next startup. Excessive start times may further be indicative of changes in process operation, and may trigger an alarm to ensure that the process operation is functioning correctly.

Table 1 indicates a number of possible monitoring parameters, the types of thresholds associated therewith, and a possible alarm level for each.

TABLE 1

| Function | Threshold Type | Alarm |
| --- | --- | --- |
| Phase current | maximum | % deviation of trend |
| Neutral current | maximum | % deviation of trend |
| Phase voltage | minimum | % deviation of trend |
| Thermal capacity used-start | maximum | % deviation |
| Motor start time | average | % deviation of trend |
| Starts per hour/day | maximum | set number exceeded |
| Phase current imbalance | maximum | % deviation of trend |
| Negative sequence current | maximum | % deviation of trend |
| Time to trip | minimum | How close to trip |
| Phase-to-phase voltage | max/min | deviation |
| Impedance during start | average | % deviation |
| RTD's: bearing, winding, ambient | maximum | Alarm on new max |

Figure 5:
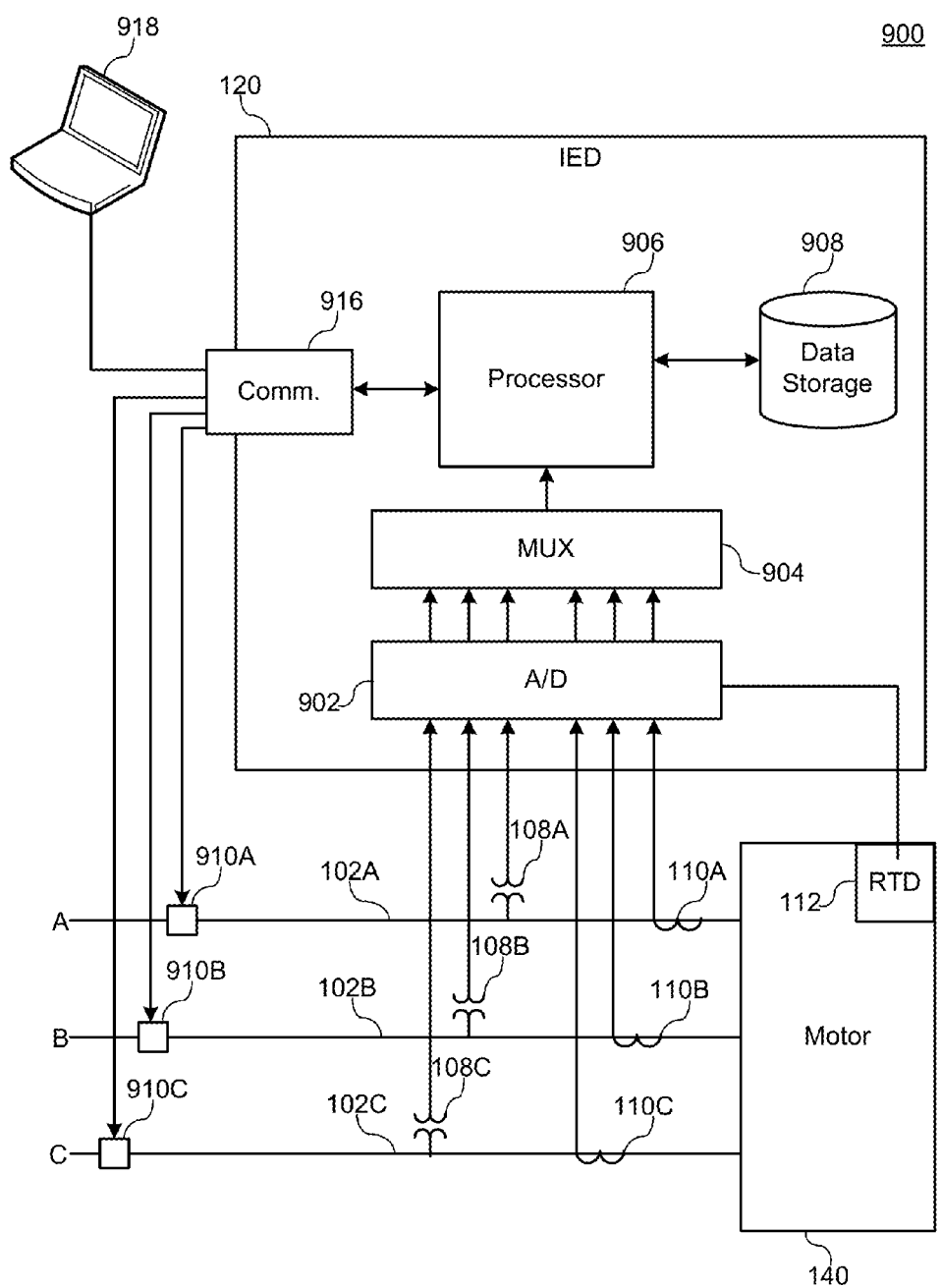
FIG. 5 illustrates a block diagram of an IED that may be used to monitor and protect an electric motor.

FIG. 5 illustrates one particular example of an apparatus and system 900 according to the present disclosure. As with FIG. 1, a three-phase electric motor 140 is protected by an IED 120 which receives power system signals in the form of signals representative of the currents and voltages from all three phases to the motor as well as temperature signals from RTD 112. The IED may be an intelligent electronics device capable of monitoring and protecting the motor using the methods described herein. Some examples of IEDs that may be used includes protective relays, motor protective relays, and the like. These signals may be provided to a processor 906 via various filters (such as low-pass filters, not separately illustrated), an analog-to-digital converter (ND) 902, and a multiplexor 904. Various other pre-processing devices and steps may be incorporated as desired. These various pre-processing devices and steps may be performed on a processor or the like. Further, the pre-processing devices and steps may include a sampler (the A/D may function as a sampler) for sampling the signals. The signals representing the currents and voltages from the three phases and temperature from the RTDs are ultimately provided to a processor (such as a microprocessor, microcontroller, application specific integrated circuit (ASIC), field programmable gate array (FPGA), and the like), where the methods described herein are performed. The IED may include data storage 908 where the particular modules, calculators, and/or computer instructions for operating the present methods may be stored. Further, values calculated by the processor 906 may be stored using the data storage 908. The IED thus contains various calculators and/or modules for making the various calculations described herein, though the various calculators are not separately illustrated.

The various modules, calculators and/or computer instructions may include a positive-sequence current calculator for calculating positive-sequence current values from the current samples. A positive-sequence voltage calculator may also be included for calculating positive-sequence voltage values from the voltage samples. A resistance calculator may be included for calculating a resistance from the positive-sequence current values and the positive-sequence voltage values as described above. An initial resistance calculator may be included for determining an initial resistance value that is equal to a minimum of the resistance values calculated by the resistance calculator during the predetermined initiation period. The initial resistance calculator may be an initial rotor resistance calculator or an initial stator resistance calculator, as described above. A slip calculator may be included for determining slip values using the initial resistance value and the resistance values, as described above. A rotor resistance calculator may be included for calculating a slip-dependent rotor resistance from the slip values using the methods described herein. The rotor resistance calculator may further calculate positive-sequence rotor resistance values from the slip values and calculate negative-sequence rotor resistance values, as described above. Further, a rotor temperature calculator may be included for calculating a rotor temperature from the current values and the slip-dependent rotor resistance values, using the methods described herein. The rotor temperature calculator may be configured to calculate rotor temperature values from the calculated positive-sequence rotor resistance values, the negative-sequence rotor resistance values, and the current values, using the equations and methods described above. Thus, the IED is capable of monitoring the motor using an accurate value of slip, calculated using a minimum of the resistance values during an initiation period.

The IED 120 further includes a communication device 916 that is capable of receiving commands from the processor 906 and transmitting them to receiving devices such as circuit breakers 910A, 910B, and 910C. If the protection modules operating on the processor 906 call for the motor to be tripped, the processor 906 can send a signal to the communications device 916 which signals circuit breakers 910A, 910B, and 910C to open, thus tripping off the motor.

Further, the communications device 916 may include a transceiver for communicating with a human-machine interface (HMI) 918 such as a computer, a laptop computer, a computer accessed via a network, or the like. Certain inputs such as motor parameters (e.g. full load current (FLA in amps), locked rotor current (LRA in per unit of FLA), locked rotor time (LRTHOT in seconds), locked rotor torque (LRQ in per unit of rated torque), full load slip (FLS in per unit)), thresholds, actions, alarms, other programming commands, and the like may be entered using the HMI and communicated to the processor 906, which may then store the values using the data storage 908.

As described above, the processor may execute modules and/or computer instructions to monitor the motor, take the requisite actions, and report the monitored values and actions taken.

Figure 6:
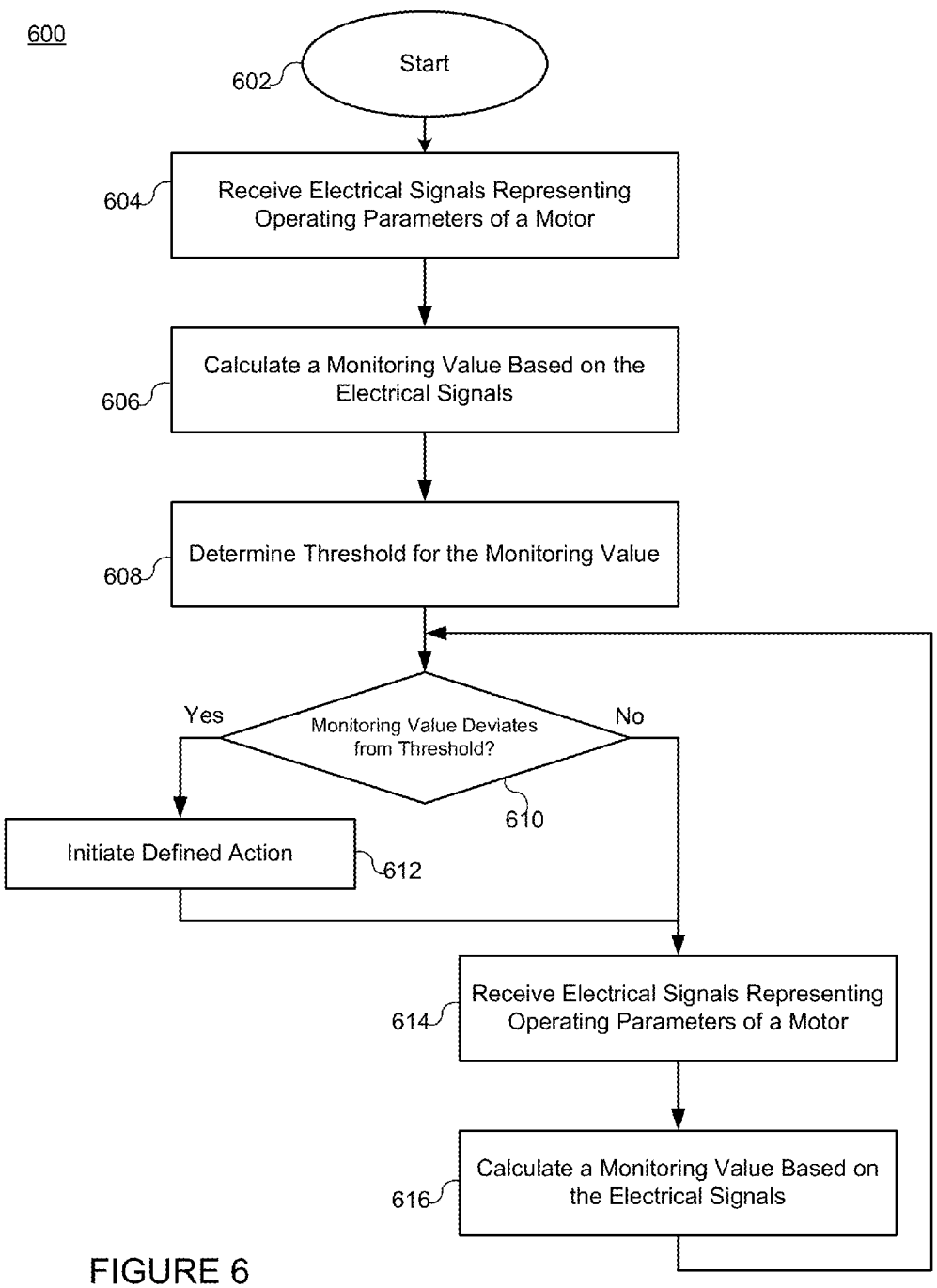
FIG. 6 illustrates a method for monitoring and protecting an electric motor.

FIG. 6 illustrates one method for 600 for protecting an electric motor according to the description herein. The method 600 starts 602 by receiving electrical signals representing operating parameters of an electric motor. As described above, the electrical signals may represent operating parameters such as motor winding temperature, ambient temperature of a motor, neutral current, phase current, phase voltage, or the like. The method then calculates a monitoring value based on the electrical signals 606. As described above, the monitoring value may include temperature at a point of the motor, neutral current, phase current, phase voltage, thermal capacity used during startup, thermal capacity used while running, thermal capacity used during startup and while running, motor start time, starts since the last reset, phase current imbalance, negative-sequence current, time to trip, phase-to-phase voltage, impedance during start, starts per time, and the like.

The method then determines a threshold for the monitoring value 608. This may be done by averaging the monitoring value for a predetermined number of successful operations. This may include multiplying the average by a predetermined number. The method then proceeds to compare the monitoring value to the threshold. The monitoring value may be newly received monitoring values from the electric motor. If the monitoring value deviates from the threshold 610, then the method initiates a defined action 612, and may then continue to receive electrical signals representing operating parameters of the motor 614, calculating a monitoring value base on the electrical signals 616, and determining whether the monitoring value deviates from the threshold 610. Otherwise, the method may end.

If, however, the monitoring value does not deviate from the threshold 610, then the method proceeds to receive electrical signals representing operating parameters of the motor 614, calculating a monitoring value base on the electrical signals 616, and determining whether the monitoring value deviates from the threshold 610.

The above description provides numerous specific details for a thorough understanding of the embodiments described herein. However, those of skill in the art will recognize that one or more of the specific details may be omitted, or other methods, components, or materials may be used. In some cases, operations are not shown or described in detail.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. An intelligent electronic device (IED) for monitoring and protecting an electric motor, comprising:
   a plurality of electrical signal inputs for obtaining a plurality of electrical signals representing operating parameters of the electric motor;
   a monitoring module configured to:
      receive the electrical signals representing operating parameters of the electric motor;
      calculate a monitoring value from one or more of the electrical signals of the plurality of electrical signals during a plurality of successful operations of the electric motor;
      calculate a threshold monitoring value from the monitoring value;
      receive new electrical signals representing operating parameters of the electric motor;
      calculate a new monitoring value from the new electrical signals; and
      initiate a defined action when the new monitoring value deviates from the threshold.

2. The IED of claim 1, wherein the defined action comprises initiating a monitoring process within the IED.

3. The IED of claim 1, wherein the defined action comprises tripping a breaker to disconnect the motor.

4. The IED of claim 1, wherein the defined action comprises triggering an alarm.

5. The IED of claim 1, wherein the defined action comprises initiating a monitoring process for equipment other than the motor.

6. The IED of claim 1, wherein the monitoring module is further configured to initiate a defined action when the monitoring value exceeds the threshold.

7. The IED of claim 1, wherein the IED further comprises a temperature input for obtaining a temperature signal from the electric motor, and the monitoring module is further configured to calculate a monitoring value from the electrical signals and the temperature signal.

8. The IED of claim 1, wherein the operating parameters include one or more of: a motor bearing temperature; a motor winding temperature; ambient temperature of a motor; a neutral current; a phase current; and a phase voltage.

9. The IED of claim 1, wherein the monitoring value is selected from the group consisting of: a temperature at a point of the motor; neutral current; phase current; phase voltage; thermal capacity used during a start; motor start time; starts since last reset; phase current imbalance; negative-sequence current; time to trip; phase-to-phase voltage; impedance during start; and, starts per time.

10. A system for monitoring assets in an industrial or utility operation, comprising:
    an electric motor;
    an intelligent electronic device (IED) in communication with the electric motor, and configured to:
       receive electrical signals representing operating parameters of the electric motor
       calculate a monitoring value from the electrical signals during a plurality of successful operations of the electric motor;
       calculate a threshold monitoring value from the monitoring value
       receive new electrical signals representing operating parameters of the electric motor;
       calculate a new monitoring value from the new electrical signals; and
       initiate a defined action when the new monitoring value deviates from the threshold.

11. The system of claim 10, wherein the defined action comprises initiating a monitoring process for another piece of equipment in the industrial or utility operation.

12. The system of claim 10, wherein the defined action comprises initiating a monitoring process within the IED.

13. The system of claim 10, wherein the defined action comprises tripping a breaker to disconnect the electric motor.

14. The system of claim 10, wherein the defined action comprises triggering an alarm.

15. The system of claim 10, wherein the IED is further configured to initiate a defined action when the monitoring value exceeds the threshold.

16. The system of claim 10, wherein the IED is further configured to receive electrical temperature signals representing an operating parameter of the electric motor, and calculate a monitoring value from the electrical signals and the temperature signals.

17. The system of claim 10, wherein the operating parameters include one or more of: a motor bearing temperature; a motor winding temperature; ambient temperature of a motor; a neutral current; a phase current; and a phase voltage.

18. The system of claim 10, wherein the monitoring value is selected from the group consisting of: a temperature at a point of the motor; neutral current; phase current; phase voltage; thermal capacity used during a start; motor start time; starts since last reset; phase current imbalance; negative-sequence current; time to trip; phase-to-phase voltage; impedance during start; and, starts per time.

19. A method comprising:
  receiving at an intelligent electronic device (IED) a plurality of electrical signals representing operating parameters of an electric motor;
  calculating a monitoring value based on one or more electrical signals of the plurality of electrical signals during a plurality of successful operations of the electric motor;
  calculating a threshold monitoring value from the monitoring value;
  receive new electrical signals representing operating parameters of the electric motor;
  calculate a new monitoring value from the new electrical signals; and
  initiating a defined action when the new monitoring value deviates from the threshold.

20. The method of claim 19, wherein the defined action comprises initiating a monitoring process for another piece of equipment in the industrial or utility operation.

21. The method of claim 19, wherein the defined action comprises initiating a monitoring process within the IED.

22. The method of claim 19, wherein the defined action comprises tripping a breaker to disconnect the electric motor.

23. The method of claim 19, wherein the defined action comprises triggering an alarm.

24. The method of claim 19, wherein the IED is further configured to initiate a defined action when the monitoring value exceeds the threshold.

25. The method of claim 19, wherein the operating parameters include one or more of: a motor bearing temperature; a motor winding temperature; ambient temperature of a motor; a neutral current; a phase current; and a phase voltage.

26. The method of claim 19, wherein the monitoring value is selected from the group consisting of: a temperature at a point of the motor; neutral current; phase current; phase voltage; thermal capacity used during a start; motor start time; starts since last reset; phase current imbalance; negative-sequence current; time to trip; phase-to-phase voltage; impedance during start; and, starts per time.

* * * * *